United States Patent [19]

Stanley

[11] Patent Number: 5,426,886
[45] Date of Patent: Jun. 27, 1995

[54] RATTLE HOLDING ATTACHMENT FOR FISHING LURES

[76] Inventor: Lonnie D. Stanley, P.O. Box 722, Huntington, Tex. 75949

[21] Appl. No.: 95,063

[22] Filed: Jul. 21, 1993

[51] Int. Cl.⁶ ............................................ A01K 85/00
[52] U.S. Cl. .................................................. 43/42.31
[58] Field of Search ........................... 43/42.31, 42.13

[56] References Cited

U.S. PATENT DOCUMENTS

| | | | |
|---|---|---|---|
| 3,802,115 | 4/1974 | Auten | 43/42.31 |
| 3,831,307 | 8/1974 | Pittman | 43/42.31 |
| 4,203,246 | 5/1980 | Sacharnoski | 43/42.31 |
| 4,619,068 | 10/1986 | Wotawa | 43/42.31 |
| 4,712,326 | 12/1987 | Hoover | 43/42.31 |
| 4,745,700 | 5/1988 | Davis | 43/42.31 |
| 4,930,247 | 6/1990 | Dubois | 43/42.31 |
| 5,024,019 | 6/1991 | Rust | 43/42.31 |
| 5,201,784 | 4/1993 | McWilliams | 43/42.13 |

*Primary Examiner*—Kurt Rowan
*Attorney, Agent, or Firm*—Harold H. Dutton, Jr.

[57] ABSTRACT

A fishing lure comprising a molded weight portion surrounding a hook extending therefrom, a skirt secured to the lure, a sound chamber having a rattle device retained therein, and an elongated flexible stem extending from the sound chamber for securing the chamber to a fishing lure; the sound chamber with the integral stem may be an attachment for existing lures for adding the capability of providing a sound chamber to lures which heretofor were not capable of providing such sound, particularly lures such as jigs and spinnerbaits.

21 Claims, 2 Drawing Sheets

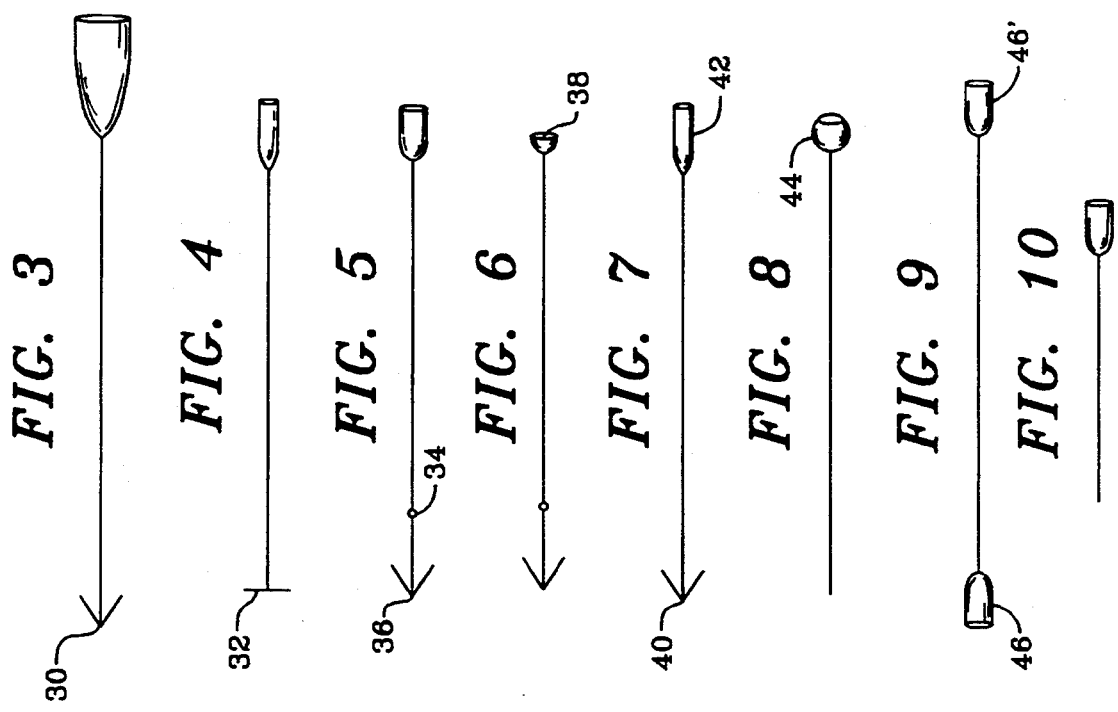

RATTLE HOLDING ATTACHMENT FOR FISHING LURES

This invention relates to an attachment for fishing lures for enabling the attachment of a noise making device thereto. More particularly the invention relates to a devices which may be used with a variety of fishing lures for securing a rattling capsule to the lure.

BACKGROUND AND OBJECTS OF THE INVENTION

In recent years, great interest has developed in the use of noise to improve the fish attracting ability of fishing lures. For example, may lures are made with a sound chamber therein, and use some means with the sound chamber to generate sound as the lure is retrieved through the water. One such technique has used small beads or shot inside a hollow chamber, so that as the lure moves about in the water, the beads generate a rattling sound. Such sounds frequently induce a strike from a fish nearby when the same lure without the noise making device would be ineffective.

Because of the success demonstrated by the use of fishing lures having a noise making ability, significant interest has developed in providing a noise making capability for different types of lures. Hollow lures of wood or molded plastic lend themselves readily adaptable to the use of sound chambers with noise making beads, but unfortunately, other types of lures are not so easily adaptable. For example, soft plastic lures such as artificial worms, grubs, snakes or the like generally are not capable of having a molded sound chamber, since the shot bouncing against the soft plastic doesn't make much noise, and therefor is ineffective. However, a number of manufacturers have produced rattles for use with such soft plastic lures, which comprise a small hollow capsule containing the beads or shot.

Such rattles are generally made of either hard, molded plastic or glass. Typically, they are an elongated capsule, perhaps pointed at one or both ends. The capsule itself is a sound chamber, and may be inserted into the body of the soft plastic worm. This, then, introduces a sound chamber into the lure, producing a rattling worm, grub, etc. Such lures have also been shown to be highly effective because of the sound added thereto.

Crude attempts have been made in the past to provide a sound chamber in other types of lures, such as jigs or spinnerbaits, but have generally met with little or no success. For example, efforts have been made to attach a rattle capsule to the lead body of a jig, using glue for example, but the bouncing of the jig on the bottom or through weeds or brush easily removes the rattle from its glued position. Other attempts have been made, for example, to attach a rattle capsule to the spinner blade of a spinnerbait type lure, but this generally disrupts the balance of the lure as it is pulled through the water, causing it to travel erratically, and thereby lose its effectiveness.

While it might be possible to mold a hollow chamber into the lead body of such lures, the lead is so soft that the noise produced by the beads or shot introduced into the chamber is drastically muffled, such that the noise is virtually inaudible.

So far as known to applicant, no prior attempts to attach a rattle to a jig or spinnerbait have met with any success because of the difficulty of attaching or providing a rattle chamber in such a lure.

Accordingly, a primary object of the present invention is to provide a device for attaching a rattle to a fishing lure.

Still another object of the invention is to provide a device which may be used to produce a noise making capability in a great variety of fishing lures.

Yet another object of this invention is to provide a device which may be easily added to an artificial fishing lure such as a jig or a spinnerbait, providing for the producing of sound as the lure is pulled through the water.

A further object of the invention is to provide a device for attaching a sound producing rattle to a fishing lure such as a jig, without interfering with the normal use of the lure.

DESCRIPTION OF THE INVENTION

According to the present invention, a hollow housing is provided with means for attaching it to the fishing lure, and the housing contains a flexible portion which is adapted to receive a glass or plastic rattle of the type containing one or more beads or shot. Very commonly, the rattles comprise an elongated hollow glass capsule approximately 0.5 inch to 1 inch in length and about 0.1 inch to about 0.25 inch in diameter. Another form of rattle is a spherical glass or hard plastic bead or ball approximately 0.25 inch in diameter. The capsule or ball contain one or more small diameter balls, typically made of steel. The rattles themselves make audible noise when shaken.

The attaching device according to the invention comprises a sound chamber for receiving such a rattle capsule and an elongated stem for securing the chamber to the lure. In one embodiment, the device comprises a generally cylindrical, hollow chamber open at one end for receiving the sound making element or rattle, with an elongated attaching stem extending from the opposite end of the chamber. The entire device, including both the chamber and the stem may be molded of soft plastic or rubber.

Jigs generally include a rubber 'skirt' surrounding the hook, and the skirt is generally secured to the lead body of the jig by means of a flexible tie surrounding the skirt material and the body. For example, a small elastic band typically or rubber strand tightly encircles the skirt material and holds the skirt in place on the body of the lure. A spinnerbait is quite similar in the way that a skirt is attached thereto, and the sound chamber attachment may be used in precisely the same manner with such a lure.

DESCRIPTION OF THE DRAWINGS

These and other objects and advantages of the present invention will become apparent from a detailed consideration of the accompanying description and claims, when taken together with the accompanying drawings, in which:

FIGS. 3–18 are plan views of various embodiments of the attachment according to the invention.

DETAILED DESCRIPTION OF PREFERRED EMBODIMENTS

Figure 1:
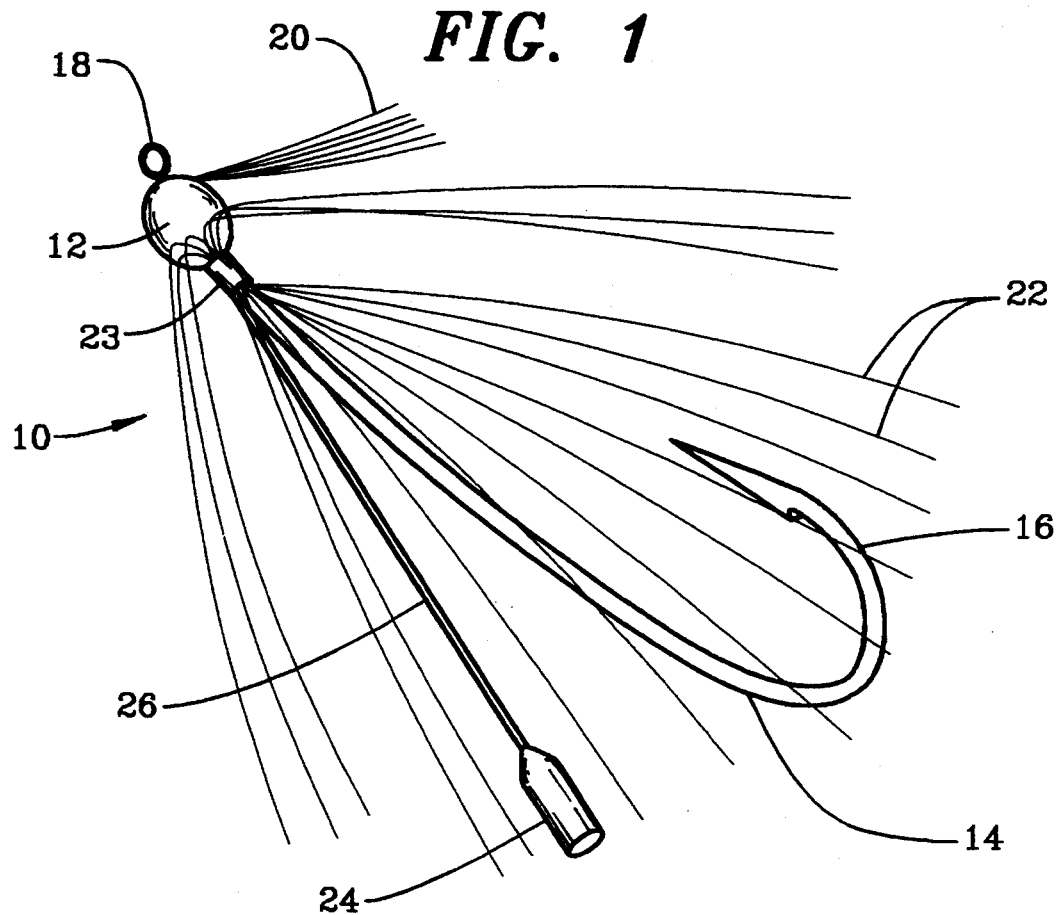
FIG. 1 is a plan view of a jig type fishing lure showing the attachment according to the present invention.

Referring first to FIG. 1, a fishing lure generally designated 10 is shown, and is of the type commonly known as a jig. The lure comprises a body portion 12 typically formed of lead and molded around a wire shank portion 14 of a fishhook. The wire shank 14 has a recurved hook portion 16 at one end and an eye 18 at the other end for attachment to a fishing line.

Quite often, such fishing jigs have a weedguard formed of stiff bristles 20 which have one end embedded in the head 12, and which extend upwardly ahead of the hook portion 16. This weedguard serves to help prevent lure from hanging up on weeds, brush or the like, while not interfering with the ability of the lure to catch a fish. Such lures also usually have a skirt which is secured to the body of the lure. The skirt is made up of a plurality of strands 22 of flexible rubber or rubber-like material. A group of such strands when clustered around the lure tend to move freely as the lure is pulled through the water creating a lifelike appearance for the lure, and simulating the movement of live bait. Typically, a group of such strands is secured near the midpoint of the strands, or slightly offset toward one end from the midpoint.

Such skirts are secured in place around the shank 14 of the hook (or in some cases around an extended portion of the weight) by any suitable means, but most commonly by means of an elastic band 23 encircling the shank and the skirt. Alternatively, a strand of the same material as used to form the skirt may be tied around the cluster of skirt strands.

The lure thus far described is essentially well known in the prior art. The improved lure is provided with an additional element in the nature of a sound chamber which is secured to the known lure. Thus, in FIG. 1, a sound chamber 24 is provided, and has an elongated stem portion 26 extending therefrom. This stem portion is preferably secured about the body of the lure in the same manner as the skirt, i.e. by means of the elastic band 23 encircling the lure 14, the skirt 22 and the stem 26. Generally, such an elastic band (or a tied piece of rubber) will be sufficiently tight, and will have adequate frictional engagement to hold the sound chamber attachment in place. However, it is also possible to provide an enlargement on the free end of the attachment to prevent the stem portion 26 from being pulled out from under the band 23.

Figure 2:
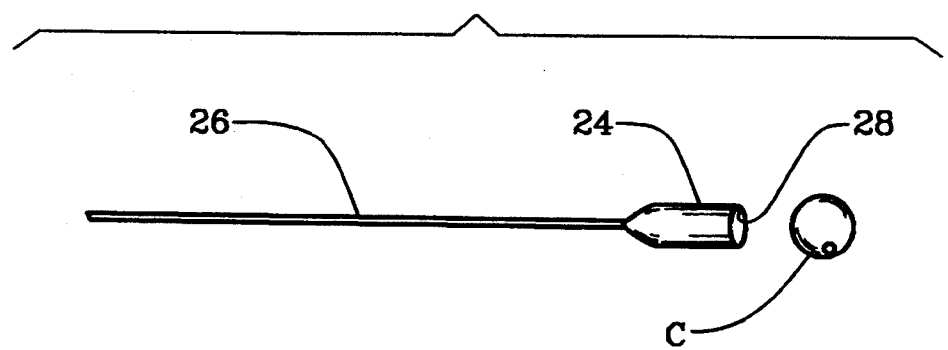
FIG. 2 is a plan view of the attachment shown in FIG. 1 removed from the lure.

As is better seen in FIG. 2, the attachment comprises a generally tubular sound chamber portion 24 which has an open end 28, which is adapted to receive a conventionally available rattle such as a molded capsule C containing one or more rattling beads. Opposite the open end 28, the sound chamber is connected to the stem portion 26. A conventional rattle may be inserted into the open end of the sound chamber. Preferably the inner diameter of the sound chamber is slightly less than the outer diameter of the rattle, so that insertion of the rattle causes a slight stretching of the tubular sound chamber, thus assuring that the rattle is held in place.

The length of the sound chamber may be greater or less than the length of the rattle. However, applicant has found that a particular advantage is achieved when the sound chamber is longer than the rattle. While not wishing to be bound by any particular theory, this advantage is believed to arise from an effect wherein the sound from the rattle resonates inside the sound chamber and is thereby amplified, much like a megaphone amplifies sound. Thus, if a rattle is used which is spherical in shape, and is inserted into the elongated, tubular sound chamber which has a length approximately twice the diameter of the spherical rattle, a noticeably amplified sound is produced.

Preferably the entire attachment device including the sound chamber portion 24 and the stem portion 26 are integrally molded of the same type of rubber material as is used to produce the skirt. A particularly desirable rubber-like material is a silicone rubber material sold as BIOFLEX ® by Dylist, Inc. This material is extremely soft and flexible, and is frequently used for the skirt material.

Referring to FIGS. 3 through 18, a variety of different configurations are illustrated. In FIG. 3, a point 30 is molded on the free end of the stem portion, which will serve to prevent the stem from pulling out of the attaching band. Similarly, FIG. 4 shows a simple bar 32 molded onto the end of the stem, and shows a more elongate sound chamber for receiving a smaller type of rattle. FIG. 5 shows a variation in which a bead 34 and an arrow 36 are formed on the stem portion to help hold the stem in place.

FIG. 6 shows a variation in which the sound chamber 38 is essentially conical, while FIG. 7 shows a variation using a molded arrow 40 in combination with a narrower sound chamber 42. FIG. 8 shows a spherical sound chamber 44 which is particularly adapted to receive a spherical rattle.

FIG. 9 shows a variation in which a sound chamber 46, 46' is provided at each end of the stem portion. This embodiment is intended to be positioned so that the attaching band is near the midpoint or slightly offset from the midpoint of the stem portion, thus providing two sound chambers. FIG. 10 is similar to the embodiment shown in FIG. 2, while FIG. 11 combines an elongated sound chamber 48 with a spherical sound chamber 50. FIG. 12 shows an embodiment in which two branches 52, 52' are provided in the stem portion 54, and each branch connects to a separate elongated sound chamber 56, 56'. FIG. 13 is similar but uses a spherical 58 and a conical 60 sound chamber on the branches. The use of multiple rattles of different sizes and shapes provides the ability to vary and modify both the quantity and the quality of the sound emitted by the sound chamber.

FIG. 14 illustrates an enlarged sound chamber intended to receive several rattles in side-by-side fashion, while FIG. 15 shows an embodiment in which two spherical rattles are positioned end-to-end. FIGS. 16, 17 and 18 also show other similar variations of the basic structure of the sound chamber attachment.

While this invention has been described as having certain preferred features and embodiments, it will be apparent that it is capable of still further variation and modification without departing from the spirit of the invention, and this application is intended to cover any and all variations, modifications and adaptations of the invention as fall within the spirit of the invention and the scope of the appended claims.

I claim:

1. A sound chamber attachment for fishing lures having a lure body portion, said attachment comprising a chamber portion for receiving and holding a rattle-containing capsule therein and an elongated flexible stem portion for securing said chamber to the body portion of a fishing lure.

2. An attachment for fishing lures as in claim 1 and wherein said chamber portion comprises an elongated tubular receptacle formed of a flexible material.

3. An attachment for fishing lures as in claim 1 and wherein said chamber portion is formed of a molded flexible rubber material and said elongated stem portion is integrally formed therewith.

4. An attachment for fishing lures as in claim 3 and wherein said chamber portion is open at one end, and said stem extends from the end opposite said open end.

5. Am attachment for fishing lures as in claim 3 and wherein said chamber portion comprises two hollow capsule receiving portions.

6. An attachment for fishing lures as in claim 5 and wherein said capsule receiving portions are connected by a single stem portion.

7. An attachment for fishing lures as in claim 5 and wherein said stem portion includes a primary stem portion and a pair of branch stem portions extending from said primary stem portion, each of said branch stem portions being connected to one of said capsule receiving portions.

8. An attachment for fishing lures as in claim 1 and wherein said chamber portion is substantially spherical.

9. An attachment for fishing lures as in claim 1 and wherein said chamber portion is substantially conical.

10. An attachment for fishing lures as in claim 1 and wherein said chamber portion is substantially bullet shaped.

11. An attachment for fishing lures as in claim 1 and wherein said stem portion terminates in enlargement means for retaining said stem in attachment with a lure.

12. An attachment for fishing lures as in claim 11 and wherein said enlargement portion is integrally formed with said stem portion.

13. A fishing lure comprising a body portion including a hook extending therefrom and an attachment comprising a chamber portion for receiving and holding a rattle-containing capsule therein and an elongated flexible stem portion for securing said chamber to the body of said fishing lure.

14. A fishing lure as in claim 13 and including a capsule in said chamber portion, said capsule having at least one noise making bead therein.

15. A fishing lure as in claim 13 and wherein said capsule comprises an elongated hollow body having an outer dimension slightly larger than the inner dimension of said chamber portion.

16. A fishing lure as in claim 13 and wherein said fishing lure comprises a molded weight portion having a skirt formed of a filamentous rubbery material, means for substantially simultaneously fastening said skirt and said stem portion of said attachment around said weight portion.

17. A fishing lure as in claim 16 and wherein said fastening means comprises an elastic band encircling said skirt, said stem portion and said lure.

18. A fishing lure as in claim 16 and wherein said fishing lure comprises a jig.

19. A fishing lure as in claim 17 and wherein said fishing lure comprises a spinnerbait.

20. A fishing lure comprising a molded weight portion surrounding a hook extending therefrom, a skirt secured to said lure, a flexible, tubular sound chamber having a rattle-containing capsule retained therein, and an integral elongated flexible stem extending from said sound chamber for securing said chamber to said fishing lure.

21. A fishing lure as in claim 20 and wherein said sound chamber comprises a flexible tubular chamber integrally formed with said flexible stem.

* * * * *